United States Patent
Naim et al.

(10) Patent No.: US 9,055,465 B1
(45) Date of Patent: Jun. 9, 2015

(54) MANAGING WIRELESS COMMUNICATION LINK RESOURCES

(71) Applicant: Sprint Spectrum LP, Overland Park, KS (US)

(72) Inventors: Muhammad Naim, Sterling, VA (US); Chunmei Liu, Great Falls, VA (US); Kevin Hart, Oakton, VA (US); David Rosen, Washington, DC (US)

(73) Assignee: Sprint Spectrum L.P., Overland Park, KS (US)

( * ) Notice: Subject to any disclaimer, the term of this patent is extended or adjusted under 35 U.S.C. 154(b) by 146 days.

(21) Appl. No.: 13/871,881

(22) Filed: Apr. 26, 2013

(51) Int. Cl.
*H04L 1/00* (2006.01)
*H04L 12/26* (2006.01)
*H04W 28/02* (2009.01)

(52) U.S. Cl.
CPC ................................ *H04W 28/0231* (2013.01)

(58) Field of Classification Search
CPC ...... H04L 47/10; H04L 47/2441; H04L 47/30
USPC .................................................. 370/235, 230
See application file for complete search history.

(56) References Cited

U.S. PATENT DOCUMENTS

| 2012/0014251 A1 | 1/2012 | Arnott et al. | |
| 2013/0021962 A1* | 1/2013 | Hu et al. | 370/315 |
| 2013/0064107 A1* | 3/2013 | Sridhar | 370/252 |

* cited by examiner

*Primary Examiner* — Ronald B Abelson (57) ABSTRACT

In systems and methods of managing wireless communication link resources, a static overhead load, a data traffic load, and a signaling load are determined of a wireless communication link between an access node and at least one wireless device. A wireless communication link load is calculated based on the static overhead load, the data traffic load, and the signaling load, and a load control process is performed when the wireless communication link load meets a load criteria.

14 Claims, 6 Drawing Sheets

MANAGING WIRELESS COMMUNICATION LINK RESOURCES

TECHNICAL BACKGROUND

Determining the loading of a wireless communication link enables a communication system to allocate resources and increase efficiencies in network communication. Typically, the loading of a wireless communication link is determined based on the data requirements of wireless devices in communication with an access node. The wireless devices data requirements are typically based on bearer data transmitted over the communication link. Reliance on bearer data to determine communication link loading provides a suboptimal determination of the true loading of a communication link.

Overview

In operation, a static overhead load, a data traffic load, and a signaling load are determined of a wireless communication link between an access node and at least one wireless device. A wireless communication link load is calculated based on the static overhead load, the data traffic load, and the signaling load, and a load control process is performed when the wireless communication link load meets a load criteria. In an embodiment, the static overhead load, the data traffic load, and the signaling load are determined for a downlink portion of the wireless communication link. In an embodiment, the signaling load comprises a plurality of transport channel load components of the wireless communication link.

In an embodiment, the first communication link load can be compared to a second communication link load comprising a second signaling load of a second wireless communication link when the first signaling load meets a load threshold. The wireless device can be instructed to communicate over the second wireless communication link when the first communication link load is greater than the second communication link load.

DETAILED DESCRIPTION

Figure 1:
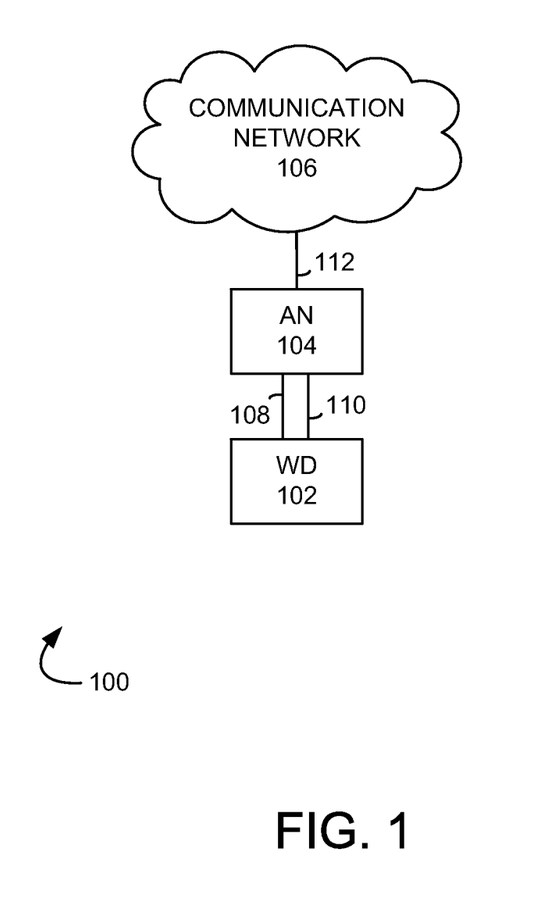
FIG. 1 illustrates an exemplary communication system to manage wireless communication link resources.

FIG. 1 illustrates an exemplary communication system 100 to manage wireless communication link resources comprising wireless device 102, access node 104, and communication network 106. Examples of wireless device 102 can comprise a cell phone, a smart phone, a computing platform such as a laptop, palmtop, or tablet, a personal digital assistant, or an internet access device, including combinations thereof. Wireless device 102 can communicate with access node 104 over communication links 108 and 110. In an embodiment, each of communication links 108 and 110 can comprise a channel, as further described below.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 112.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information, for example, to support voice communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise a wireless network, including base stations, wireless communication nodes, telephony switches, internet routers, network gateways, computer systems, communication links, or some other type of communication equipment, and combinations thereof.

Communication links 108, 110 and 112 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

A wireless communication link can comprise one or more logical channels, one or more transport channels, and one or more physical channels. A logical channel typically describes different flows of information, such as bearer data and/or signaling information, and can be organized differently for uplink and downlink portions of a communication link. A transport channel typically organizes information, such as data packets, received from one or more logical channels for transmission over a communication link, and can define how and with what type of characteristics information is transferred by the physical channel. A physical channel typically comprises a carrier frequency or a number of carrier frequencies in a communication link, and provides a physical transmission medium for one or more transport channels.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

Determining the loading of a wireless communication link enables a communication system to allocate resources and increase efficiencies in network communication. Typically, the loading of a wireless communication link is determined based on the data requirements of wireless devices in communication with an access node. The wireless devices data requirements are typically based on bearer data transmitted over the communication link. However, signaling overhead, such as control signals and the like, further consume limited physical and logical communication link resources. For example, the downlink portion of a wireless communication channel comprises both bearer data (e.g., user data) and various control signaling. Accounting for the signaling load as well as the bearer data load can enable a more accurate determination of wireless communication link loading.

Figure 2:
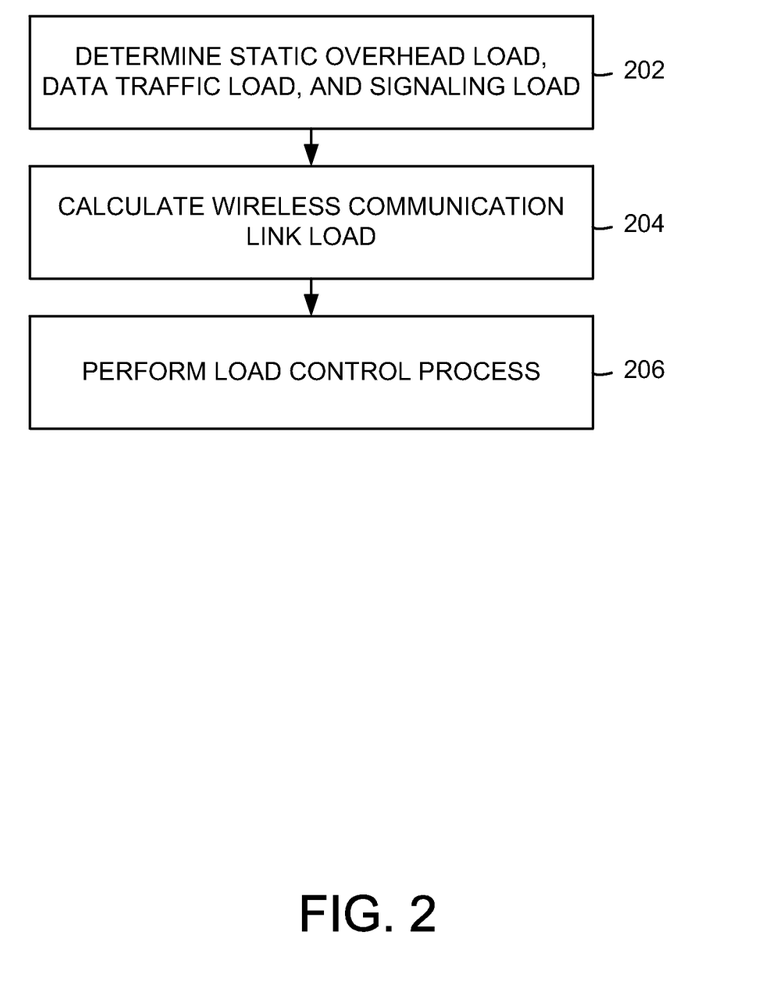
FIG. 2 illustrates an exemplary method of managing wireless communication link resources.

In operation, a static overhead load, a data traffic load, and a signaling load are determined for wireless communication link 108 and/or 110 between access node 104 and at least one wireless device 102. A wireless communication link load is calculated for communication link 108 and/or communication link 110 based on the static overhead load, the data traffic load, and the signaling load. When the wireless communication link load meets a load criteria, a load control process is performed FIG. 2 illustrates an exemplary method of managing wireless communication link resources. In operation 202, a static overhead load, a data traffic load, and a signaling load of a wireless communication link between an access node and at least one wireless device are determined. For example, for a signaling load of communication links 108 and/or 110 between wireless device 102 and access node 104, a static overhead load, a data traffic load, and a signaling load can be determined. Communication links 108 and/or 110 can be organized into resource elements, which can be assigned to physical channels and organized in logical channels. For certain resource elements which are not designated to carry bearer data, the assignment of resource elements is relatively fixed and typically does not depend on bearer data traffic (as further described below, this does not apply to all non-bearer data). Resource element assignments which are not used to carry bearer data and which are relatively fixed can be considered static overhead, and a static overhead load can be determined for these resource elements for communication link 108 and/or 110.

In addition, a data traffic load can be determined for communication link 108 and/or 110. The data traffic load comprises resource element assignments for bearer data, and can include voice data, data for applications running on a wireless device, and the like. In certain communication protocols (such as, for example, GSM and LTE) data traffic in the downlink portion of a communication link is typically carried in a physical downlink shared channel (PDSCH). Other protocols can comprise a functionally similar organization of bearer data.

Figure 3A:
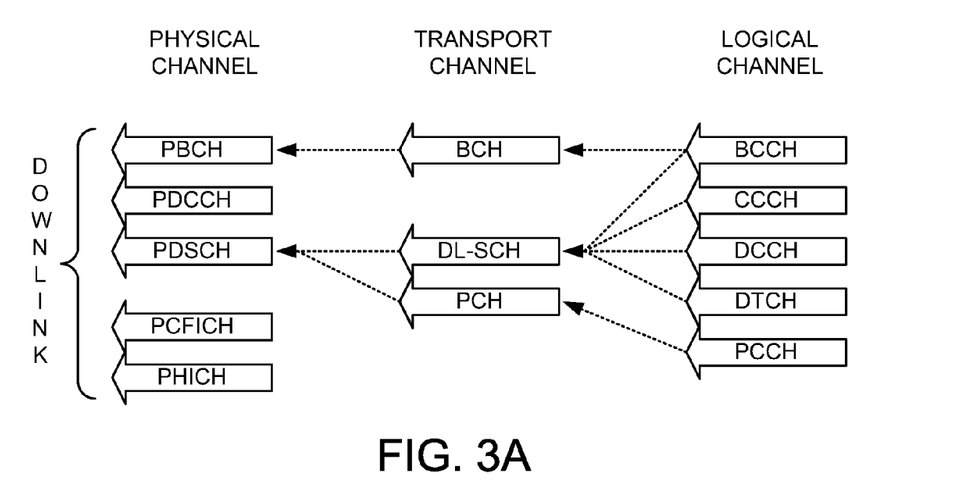
FIG. 3A illustrates an exemplary channel mapping.

Further, a signaling load can be determined for communication link 108 and/or 110. The signaling load of a communication link comprises non-bearer data transmitted to perform a control function or to provide non-bearer data related information. The organization of bearer data and non-bearer data can be relatively specific to a radio access technology protocol, but functional similarities can typically be found across various radio access technologies. Referring to FIG. 3A, as one example, in the PDSCH, two transport channels are carried, a paging channel (PCH) and a downlink shared channel (DL-SCH). The PCH comprises signaling data related to sending a paging message to wireless devices which have entered a low power or idle mode, and carries signaling information of the paging control channel (PCCH). The DL-SCH comprises signaling data related to various signaling logical channels, including a broadcast control channel (BCCH), a common control channel (CCCH), and a dedicated control channel (DCCH), as well as bearer data in a dedicated traffic channel (DTCH).

The BCCH carries system information to wireless devices to provide, for example, parameter information about access node 104. The PCCH carries paging information for a paging operation to locate a wireless device which has entered a low power or idle mode and to provide the wireless device with information about, for example, an incoming call or message. The CCCH carries information which can be used by a wireless device to request a new connection with access node 104. The DTCH carries bearer data, such as voice data, or other data for an application running on a wireless device. By taking into account the logical channel load of the BCCH, CCCH, DCCH and PCCH, a signaling load can be determined, for example, for communication link 108 and/or 110.

Returning to FIG. 2, in operation 204, a wireless communication link load is calculated based on the static overhead load, the data traffic load, and the signaling load. For example, referring to FIG. 3B, a communication link load can be calculated based on a sum of the determined static overhead load, the data traffic load, and the signaling load. In an embodiment, the communication link load can be determined separately for a downlink portion and/or for an uplink portion of the communication link. In an embodiment, the communication link load comprises a number of resource elements (such as, for example, physical resource blocks) based on a sum of the determined static overhead load, data traffic load, and signaling load of the communication link. In addition, determining the communication link load also enables a determination of remaining communication link capacity unoccupied by the determined communication link load.

Figure 3B:
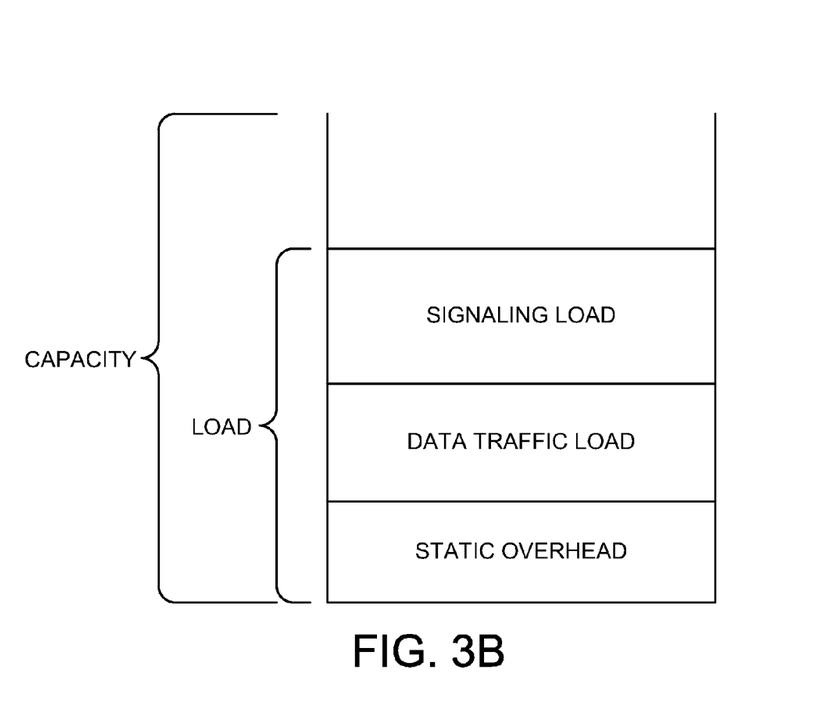
FIG. 3B illustrates an exemplary load determination.

The signaling load can comprise, in an embodiment, a sum of components of the physical downlink shared channel load, comprising a paging channel component load and a downlink shared channel load component. In an embodiment, the downlink shared channel load component can comprise at least one of a broadcast control channel load component, a common control channel load component, a dedicated control channel load component, and a paging control channel load component.

In an embodiment, a downlink load of a communication link can be determined as follows:

DL load=total static overhead load+total data traffic load+total signaling load [Equation 1]

In an embodiment, the signaling load on the PDSCH can be determined as follows:

Signaling load=total BCCH load (for SIB signaling)+total CCCH load+total DCCH load+total PCCH load [Equation 2]

Each load component can comprise a number of resource elements used to carry signaling data per unit time, or per frame, or per subframe. The resource elements can comprise physical resource blocks. In an example, the total BCCH load for SIB signaling and the total PCH load can be determined at the access node. In another example, the total load for the CCCH, DCCH and DTCH for each wireless device can be determined based on the resource elements assigned to each wireless device. In an embodiment, the total load for the CCCH, DCCH and DTCH for each wireless device can be determined as follows:

Signaling load$_2$=bits utilized per channel/total of (bits transmitted per channel) [Equation 3]

The channel of Equation 3 can comprise one or more of the CCCH, the DCCH and the DTCH. For example, where all three channels are considered, Equation 3 can be rewritten such that a sum of bits transmitted over the CCCH, DCCH and DTCH comprise the numerator, and a sum of the total number of bits transmitted over the CCCH, DCCH and DTCH comprise the denominator.

In an embodiment, the signaling loads used in Equation 1, Equation 2 and Equation 3 each comprise an average load value over a predetermined time interval to reduce short term load fluctuations. The time interval can comprise a plurality of subframes, a plurality of frames, a discrete period of time, or another time interval.

Returning to FIG. 2, in operation 206, a load control process is performed when the wireless communication link load meets a load criteria. For example, when the wireless communication link load meets a threshold level of resource utilization or communication link congestion, requests for a communication link to access node 104 from new wireless devices can be denied. In addition, when the wireless communication link load meets a threshold level of resource utilization or communication link congestion, wireless device 102 can be instructed to change from communicating over a first channel (such as communication link 108) to communicating over a second channel (such as communication link 110).

In an embodiment, while each of communication links 108 and 110 can carry multiple logical and transport channels (for example, DCCH, CCCH, etc.), each communication link typically does not carry data intended for a different logical channel over same communication link. Thus, the load control process can be performed to instruct wireless device 102 to change from communicating over a first channel (such as communication link 108) to communicating over a second channel (such as communication link 110).

In an embodiment, in addition to the load criteria of the wireless communication link, a signaling load criteria can be determined. When the signaling load of the communication link meets the signaling load criteria, a load control process can be performed. The load control process can comprise, for example, refusal of communication resources for new wireless devices, and instructing wireless device 102 to from communicating over a first channel (e.g., communication link 108) to communicating over second channel (e.g., communication link 110). In other words, a load control process can be triggered when the signaling load of the communication link meets the signaling load criteria.

In an embodiment, each of the static overhead load, the data traffic load, and the signaling load can be determined for a particular traffic type indicator of data traffic over the wireless communication link. For example, bearer data and related signaling messages can be associated with an indication, for example, of scheduling priority, routing priority, minimum bandwidth allocation, and the like, including combinations thereof. Each of the static overhead load, the data traffic load, and the signaling load can be determined for a particular traffic type indicator of data traffic. As one example, certain data traffic can be associated with a quality of service (QoS) class indicator (QCI), which can be used to differentiate priorities of service flows in a communication link, or in a specific channel of a communication link, and which can be used to determine access node-specific parameters such as link layer configuration, scheduling weights, and queue management.

In an embodiment, a QCI can comprise a guaranteed bit rate (GBR) indication and a non-guaranteed bit rate (non-GBR) indication. Other examples are also possible. When a communication link load and/or a signaling load for a communication link is determined for a particular traffic type indicator, remaining communication link capacity for the traffic type indicator can also be determined. By separately measuring and monitoring of various data and signaling loads, the load control processes for an access node can be performed at a greater level of specificity, especially where a traffic type indicator is also considered in the wireless communication link load.

Figure 4:
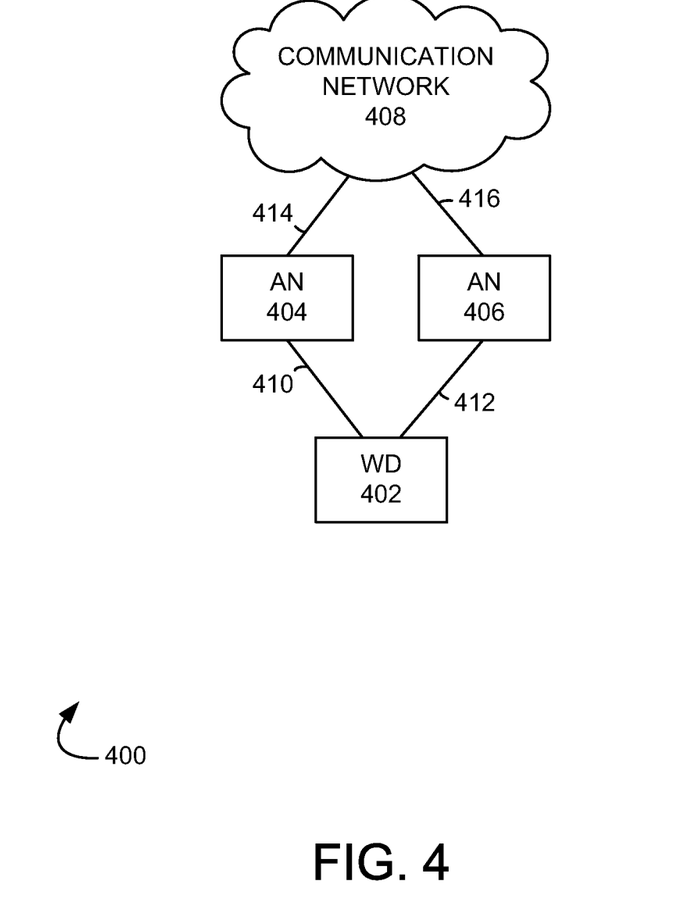
FIG. 4 illustrates another exemplary communication system to manage wireless communication link resources.

FIG. 4 illustrates another exemplary communication system to manage wireless communication link resources comprising wireless device 402, access node 404, access node 406, and communication network 408. Examples of wireless device 402 can comprise a cell phone, a smart phone, a computing platform such as a laptop, palmtop, or tablet, a personal digital assistant, or an internet access device, including combinations thereof. Wireless device 402 can communicate with access node 404 over communication link 410, and with access node 406 over communication link 412.

Access nodes 404 and 406 are each a network node capable of providing wireless communications to wireless device 402, and can be, for example, a base transceiver station, a radio base station, an eNodeB device, or an enhanced eNodeB device. Access node 404 is in communication with communication network 408 over communication link 414, and access node 406 is in communication with communication network 408 over communication link 416.

Communication network 408 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 408 can be capable of carrying voice information, for example, to support voice communications by a wireless device such as wireless device 402. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 408 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 408 may also comprise a wireless network, including base stations, wireless communication nodes, telephony switches, internet routers, network gateways, computer systems, communication links, or some other type of communication equipment, and combinations thereof.

Communication links 410, 412, 414 and 416 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Figure 5:
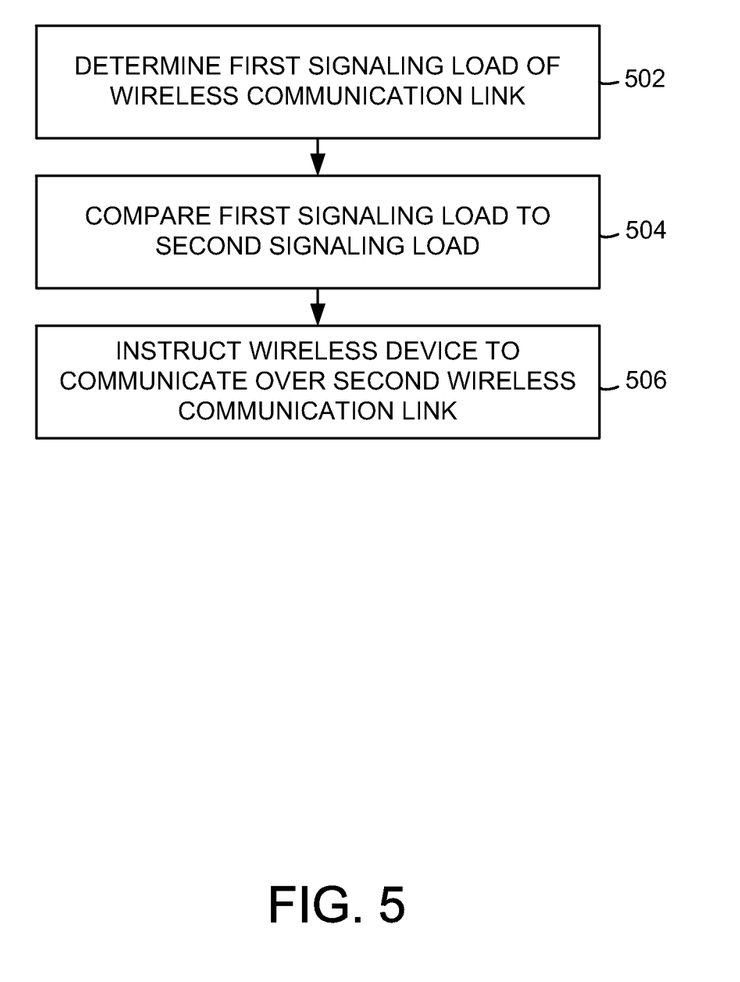
FIG. 5 illustrates another exemplary method of managing wireless communication link resources.

FIG. 5 illustrates another exemplary method of managing wireless communication link resources. In operation 502, a first communication link load is determined comprising a first signaling load of a first wireless communication link between an access node and at least one wireless device. For example, as between wireless device 402 and access node 404, a signaling load for communication link 410 can be determined. In addition, a static overhead load and a data traffic load can also be determined. For example, communication link 410 can be organized into resource elements, which can be assigned to physical channels and organized in logical channels. For certain resource elements which are not designated to carry bearer data, the assignment of resource elements is relatively fixed and typically does not depend on bearer data traffic. These certain resource element assignments which are not used to carry bearer data and which are relatively fixed can be considered static overhead, and a static overhead load can be determined for these resource elements for communication link 410.

In addition, a data traffic load can be determined for communication link 410. The data traffic load comprises resource element assignments for bearer data, and can include voice data, data for applications running on a wireless device, and the like. In certain communication protocols (such as, for example, GSM and LTE) data traffic in the downlink portion of a communication link is typically carried in a physical downlink shared channel (PDSCH). Other protocols can comprise a functionally similar organization of bearer data. Further, a signaling load can be determined for communication link 410. The signaling load of a communication link comprises non-bearer data transmitted to perform a control function. The organization of bearer data and non-bearer data can be relatively specific to a radio access technology protocol, but functional similarities can typically be found across various radio access technologies.

In operation 504, the first communication link load is compared to a second communication link load comprising a second signaling load of a second wireless communication link when the first signaling load meets a load threshold. For example, a second communication link load can be determined for communication link 412 between access node 406 and wireless device 402. The signaling load can comprise, in an embodiment, a sum of components of the physical downlink shared channel load, comprising a paging channel component load and a downlink shared channel load component. In an embodiment, the downlink shared channel load component can comprise at least one of a broadcast control channel load component, a common control channel load component, a dedicated control channel load component, and a paging control channel load component. In an embodiment, the first communication link load and the second communication link load can be determined for different channels of communication link 410 between access node 404 and wireless device 402.

In addition to the signaling load, a wireless communication link load can be determined for each of the first communication link and the second communication link. Each communication link load can be calculated based on the respective static overhead load, the data traffic load, and the signaling load of each communication link. For example, a communication link load can be calculated based on a sum of the determined static overhead load, the data traffic load, and the signaling load. In an embodiment, the communication link load can be determined separately for a downlink portion and/or for an uplink portion of the communication link. In an embodiment, the communication link load comprises a number of resource elements (such as, for example, physical resource blocks) based on a sum of the determined static overhead load, data traffic load, and signaling load of the communication link. In addition, determining the communication link load also enables a determination of remaining communication link capacity unoccupied by the determined communication link load.

Each load component can comprise a number of resource elements used to carry signaling data per unit time, or per frame, or per subframe. The resource elements can comprise physical resource blocks. In an example, the total BCCH load and the total PCH load can be determined at the access node. In another example, the total load for the CCCH, DCCH and DTCH for each wireless device can be determined based on the resource elements assigned to each wireless device. In an embodiment, the total load for the CCCH, DCCH and DTCH for each wireless device can be determined based on the total bits utilized in the CCCH, DCCH and DTCH, respectively, per the total bits transmitted in the CCCH, DCCH and DTCH, respectively. Alternatively, or in addition, a total load comprising all three of the CCCH, DCCH and DTCH components can also be determined. The signaling load can comprise an average load value over a predetermined time interval to reduce short term load fluctuations. The time interval can comprise a plurality of subframes, a plurality of frames, a discrete period of time, or another time interval.

In operation 506, the wireless device is instructed to communicate over the second wireless communication link when the first communication link load is greater than the second communication link load. For example, when the wireless communication link load meets a threshold level of resource utilization or communication link congestion, wireless device 402 can be instructed to change from communicating over communication link 410 to communicating over communication link 412.

In an embodiment, in addition to the first signaling load and the second signaling load, the first communication link load and the second communication link load can comprise the respective static overhead load, the data traffic load, and the signaling load of each communication link. In such case, the comparison of the first communication link load and the second communication link load can involve a determination of the static overhead load, the data traffic load, and the signaling load of each communication link.

In an embodiment, the wireless communication link load signaling load of the downlink portion of the communication link can be used to improve traffic management of the network. That is, the determination of the static overhead load, the data traffic load, and the signaling load of a communication link can be made for the downlink portion (and/or the uplink portion) of the communication link. In an embodiment, the wireless communication link load signaling overhead on the PDSCH component of cell load can be used to improve traffic management of the network.

Figure 6:
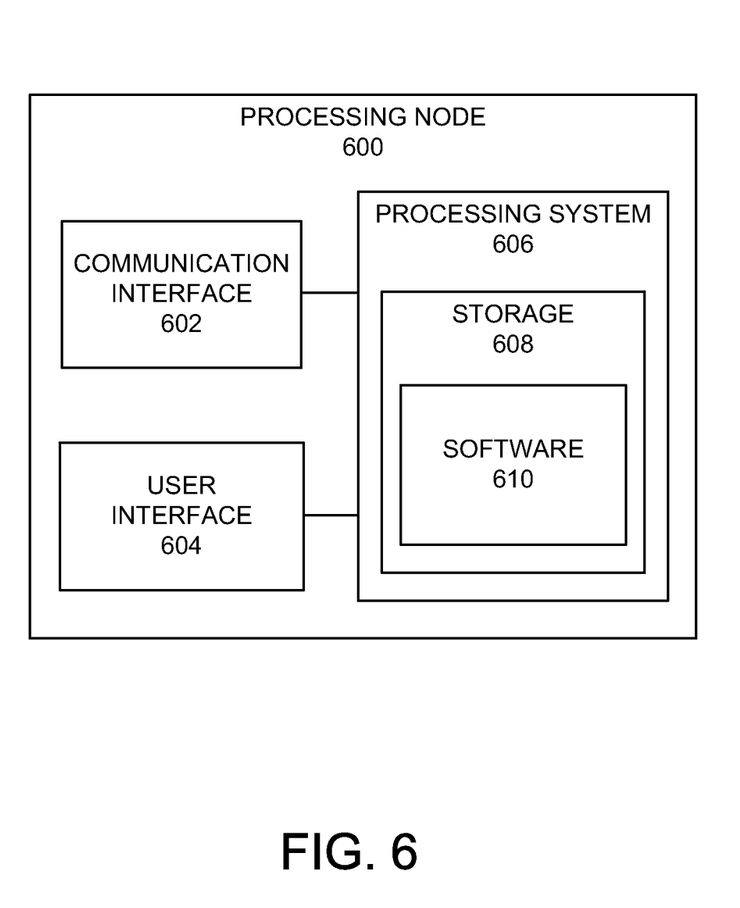
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 is capable of detecting unauthorized tethering by a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access node 104, access node 404 and access node 406. Processing node 600 can also be an adjunct or component of a network element such as an element of access node 104, access node 404 and access node 406. Processing node 600 can also be another network element in a communication system. Further, the functionality of processing node 600 can be distributed over two or more network elements.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of managing wireless communication link resources, comprising:
   determining a static overhead load, a data traffic load, and a signaling load of a wireless communication link between an access node and at least one wireless device;
   calculating a wireless communication link load based on the static overhead load, the data traffic load, and the signaling load;
   comparing the wireless communication link load to a first load criteria;
   comparing the signaling load to a second load criteria; and
   performing a load control process when the wireless communication link load meets the first load criteria or the signaling load meets the second load criteria.

2. The method of claim 1, wherein the static overhead load, the data traffic load, and the signaling load are determined for a downlink portion of the wireless communication link.

3. The method of claim 1, wherein the signaling load comprises a plurality of transport channel load components of the wireless communication link.

4. The method of claim 3, wherein the plurality of transport channel load components comprises a paging channel load and a downlink shared channel load.

5. The method of claim 4, wherein the plurality of transport channel load components further comprises a paging channel component load of the paging channel load.

6. The method of claim 4, wherein the plurality of transport channel load components further comprises a downlink shared channel load component of the downlink shared channel load.

7. The method of claim 6, wherein the downlink shared channel load component of the downlink shared channel load further comprises at least one of a broadcast control channel load component, a common control channel load component, a dedicated control channel load component, and a paging control channel load component.

8. The method of claim 1, further comprising determining each of the static overhead load, the data traffic load, and the signaling load associated with a traffic type indicator of data traffic over the wireless communication link.

9. The method of claim 1, wherein performing the load control process further comprises instructing the wireless device to change from the wireless communication link to a second wireless communication link.

10. A system for managing wireless communication link resources, comprising:
    a processing node, configured to:
        determine a static overhead load, a data traffic load, and a signaling load of a wireless communication link between an access node and at least one wireless device;
        calculate a wireless communication link load based on the static overhead load, the data traffic load, and the signaling load;
        compare the wireless communication link load to a first load criteria;
        compare the signaling load to a second load criteria; and
        perform a load control process when the wireless communication link load meets the first load criteria or the signaling load meets the second load criteria.

11. The system of claim 10, wherein the static overhead load, the data traffic load, and the signaling load are determined for a downlink portion of the wireless communication link.

12. The system of claim 10, wherein the signaling load comprises a plurality of transport channel load components of the wireless communication link.

13. The system of claim 12, wherein the plurality of transport channel load components comprises a paging channel load and a downlink shared channel load.

14. The system of claim 13, wherein the paging channel load further comprises paging channel component load, and wherein the downlink shared channel load further comprises at least one of a broadcast control channel load component, a common control channel load component, a dedicated control channel load component, and a paging control channel load component.

* * * * *